United States Patent [19]

Verhaeg

[11] Patent Number: 5,667,115
[45] Date of Patent: Sep. 16, 1997

[54] VEHICLE INTERIOR STORAGE CONTAINER

[76] Inventor: Martien Verhaeg, 2633 Wellington Ct., Concord, Calif. 94520

[21] Appl. No.: 678,147

[22] Filed: Jul. 11, 1996

Related U.S. Application Data

[63] Continuation of Ser. No. 379,912, Jan. 30, 1995, abandoned.

[51] Int. Cl.$^6$ ........................................................... B60R 7/00
[52] U.S. Cl. ........................................... 224/275; 224/542
[58] Field of Search .......................... 224/402, 42.11, 224/542, 539, 925, 275

[56] References Cited

U.S. PATENT DOCUMENTS

| | | | |
|---|---|---|---|
| 1,456,247 | 5/1923 | Miller | 224/542 |
| 1,502,180 | 7/1924 | Dever, Jr. | 224/275 X |
| 2,934,374 | 4/1960 | Mortenson et al. | 224/452 X |
| 3,131,813 | 5/1964 | Jensen | 224/275 |
| 3,321,237 | 5/1967 | Gangell | 296/63 |
| 4,512,503 | 4/1985 | Gioso | 224/539 |
| 5,065,920 | 11/1991 | Anmer | 224/275 |
| 5,096,249 | 3/1992 | Hines | 224/275 X |
| 5,249,724 | 10/1993 | Green | 224/275 |
| 5,441,183 | 8/1995 | Frenzel | 224/542 |

FOREIGN PATENT DOCUMENTS

| | | | |
|---|---|---|---|
| 4240786 | 7/1993 | Germany | 224/539 |

*Primary Examiner*—Renee S. Luebke
*Attorney, Agent, or Firm*—Haverstock & Associates

[57] ABSTRACT

An interior vehicle storage container includes one or more storage compartments securable by one or more substantially flat covers. Preferably, three storage compartments are integrally formed within a single enclosure and separated and covered by three substantially flat hinged covers. A middle storage compartment has a height dimension less than the height dimension of a left end compartment and a right end compartment, for straddling a raised surface on the floor of the vehicle. The middle compartment and the right end compartment share a common wall through which an aperture protrudes for storing a long item, such as a car jack handle through both the middle and right end compartments. Alternatively, the three compartments are separately constructed and designed to integrally fit together. An exterior restraint apparatus is also included for restraining goods stacked on the top of the substantially flat covers, such as grocery bags and the like.

17 Claims, 4 Drawing Sheets

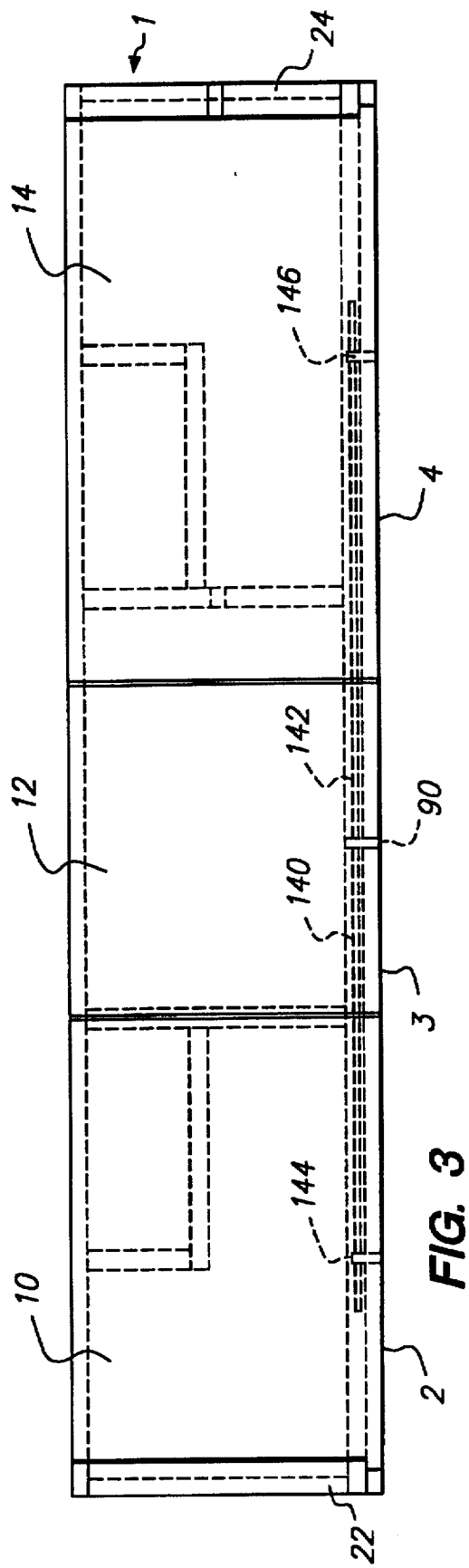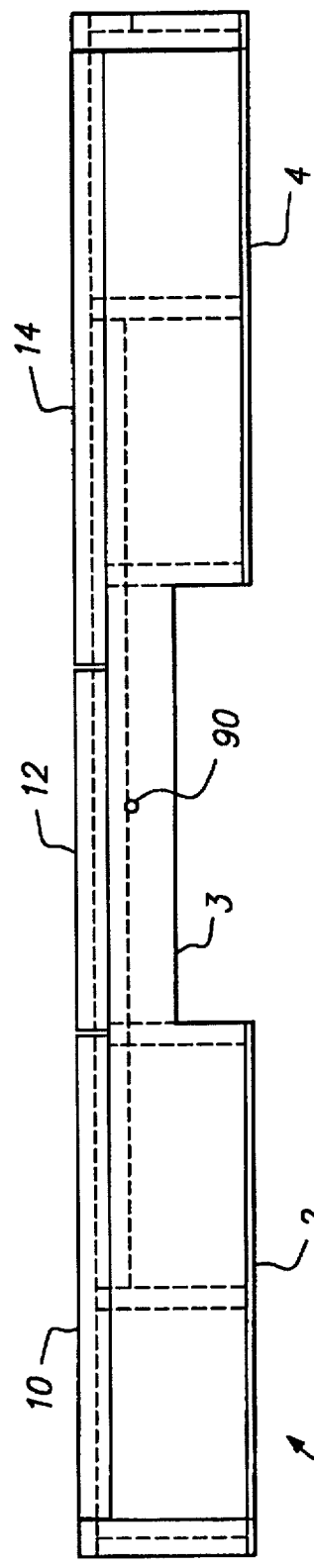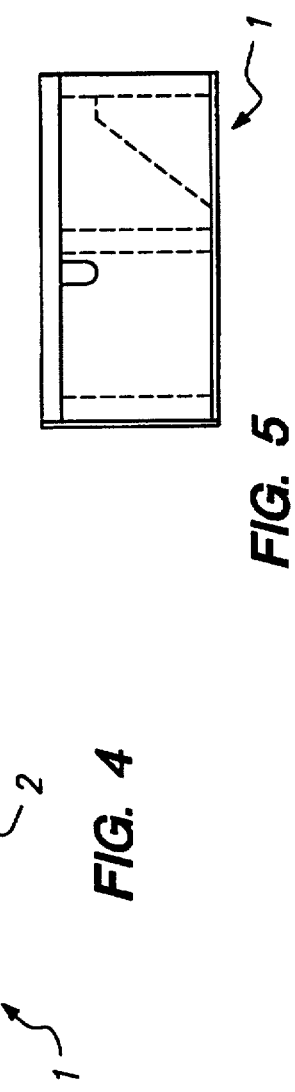
FIG. 3
FIG. 4
FIG. 5

VEHICLE INTERIOR STORAGE CONTAINER

This is a Continuation of application Ser. No. 08/379,912 filed on Jan. 30, 1995, and now abandoned.

FIELD OF THE INVENTION

The present invention relates to the field of storage containers for vehicles. More particularly, the present invention relates to the field of storage containers for mounting within the interior of a vehicle.

BACKGROUND OF THE INVENTION

Vehicle storage containers are used to store items such as jumper cables, car jacks, spare parts, tools and other like items. Different types of vehicle storage containers have been taught which provide out-of-sight space for these items in various locations of the vehicle. Such storage containers are particularly useful in vehicles which do not have a trunk or other secured storage space, such as minivans or pickup trucks.

Amner, in U.S. Pat. No. 5,065,920, issued on Nov. 19, 1991, teaches a stowage tray which is mounted on rails, beneath a seat in the vehicle, so that it can slide out and thereby allow access to the interior space of the tray. The available storage space of this tray is however very limited and is not capable of storing big items. Further, this stowage tray, as taught by Amner, is also limited to certain types of vehicles which include a proper seat, under which the tray will fit, and space to pull the tray out.

Green, in U.S. Pat. No. 5,249,724, issued on Oct. 5, 1993, teaches an underseat storage container which is designed to fit under a bench seat within a minivan vehicle. The storage container as taught by Green does not include a cover or other means for securing or locking items within the storage container.

Tool storage boxes which fit in the bed of a pickup truck are generally known. Such tool storage boxes are generally placed immediately behind the cab of a pickup truck and are accessible, from the side of the pickup truck, without climbing into the bed of the pickup truck. However, these tool storage boxes are not accessible from the interior of the vehicle causing a person accessing these tool storage boxes in inclimate weather to be exposed to the harsh weather.

What is needed is an interior storage container which fits within an interior of a pickup truck or other vehicle and provides a secure storage space for assorted items within the interior of the truck. What is further needed is an interior storage container which also provides a substantially flat surface for stacking goods, such as grocery bags, in a safe and secure manner within the interior of a pickup truck or other vehicle.

SUMMARY OF THE INVENTION

An interior vehicle storage container includes one or more storage compartments securable by one or more substantially flat covers. Preferably, three storage compartments are integrally formed within a single enclosure and separated and covered by three substantially flat hinged covers. A middle storage compartment has a height dimension less than the height dimension of a left end compartment and a right end compartment, for straddling a raised surface on the floor of the vehicle. The middle compartment and the right end compartment share a common wall through which an aperture protrudes for storing a long item, such as a car jack handle through both the middle and right end compartments. Alternatively, the three compartments are separately constructed and designed to integrally fit together. An exterior restraint apparatus is also included for restraining goods stacked on the top of the substantially flat covers, such as grocery bags and the like.

BRIEF DESCRIPTION OF THE DRAWINGS

FIG. 3 illustrates a top view of the vehicle interior storage container of the present invention.

FIG. 4 illustrates a front view of the vehicle interior storage container of the present invention.

FIG. 5 illustrates a side view of the vehicle interior storage container of the present invention.

DETAILED DESCRIPTION OF THE PREFERRED EMBODIMENT

Figure 1:
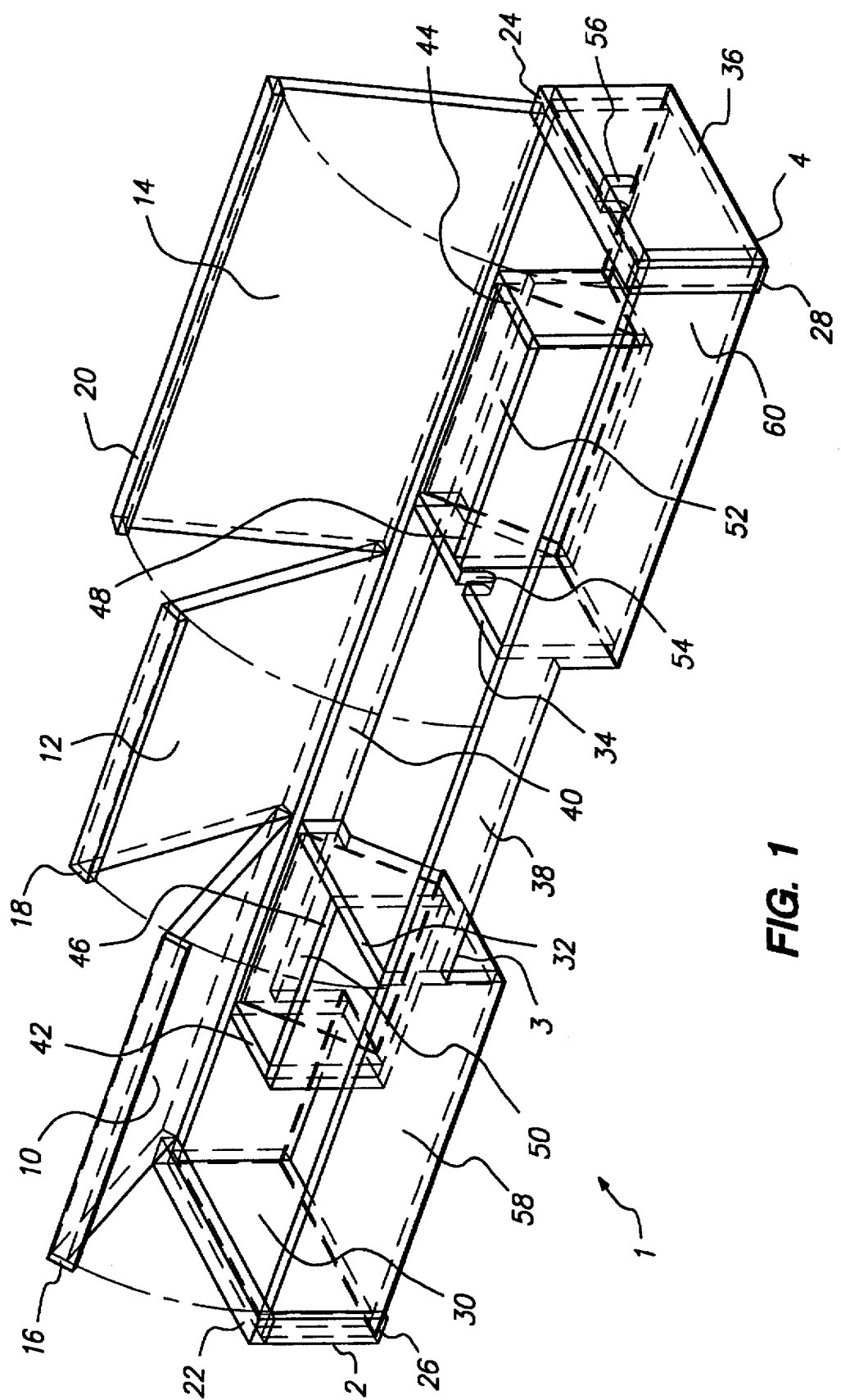
FIG. 1 illustrates a perspective view of the vehicle interior storage container of the present invention.

A perspective view of the vehicle interior storage container of the present invention is illustrated in FIG. 1. The storage container 1 of the present invention is designed to fit within the interior of a vehicle. The preferred embodiment of the present invention is designed specifically for placement within the rearmost portion of the interior of a Chevrolet or GMC extended cab pickup truck, underneath the fold down seat. Because most pickup trucks include a raised surface in the middle of the floorboard over the drivetrain, the storage container of the present invention has been designed so that the middle of the storage container has a height dimension less than the ends of the storage container. The raised middle compartment allows the storage container to rest on the floorboard over this raised surface and provide a substantially flat surface onto which items, such as grocery bags and the like may be stacked while simultaneously providing interior storage space within the storage container.

Preferably, the storage container 1 of the present invention includes three storage compartments, as illustrated in FIG. 1. In the preferred embodiment, the rear wall 40 and the front wall 38 are formed of a single piece of material and include a length dimension which extends the entire length of the storage container 1. Alternatively, both the rear wall 40 and the front wall 38 could be comprised of sections for each compartment.

The left end storage compartment 2 is formed of a left exterior wall 30, a left interior wall 32, a left bottom 58, the rear wall 40 and the front wall 38. The left cover 10 is coupled by a hinge to the rear wall 40. When in a closed position the left cover 10 will fully enclose the left end storage compartment 2. The right end storage compartment 4 is formed of a right exterior wall 36, a right interior wall 34, a right bottom 60, the rear wall 40 and the front wall 38. The right cover 14 is coupled by a hinge to the rear wall 40. When in a closed position the right cover 14 will fully enclose the right end storage compartment 4. The middle storage compartment 3 is formed of the left interior wall 32, the right interior wall 34, the rear wall 40, the front wall 38.

In the preferred embodiment, the middle storage compartment 3 does not include a bottom because it rests over the relatively flat raised surface of the floorboard which may be utilized as a bottom. Alternatively, the middle storage compartment 3 will include a bottom. The middle cover 12 is coupled by a hinge to the rear wall 40. The middle storage compartment is enclosed by both the middle cover 12 and the right cover 14.

Figure 2:
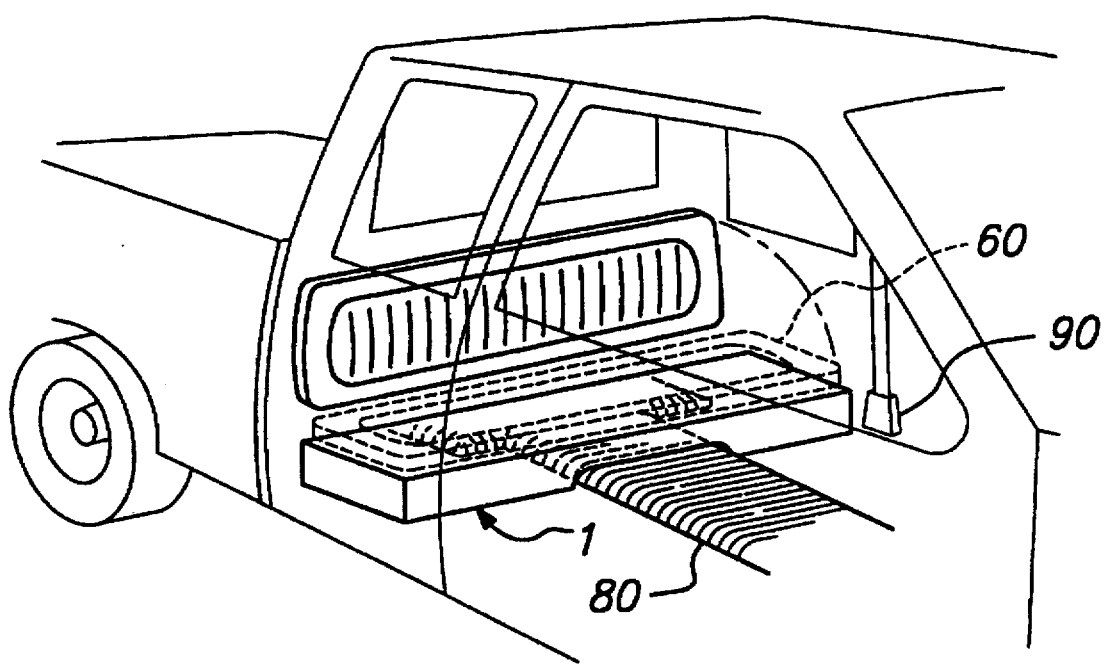
FIG. 2 illustrates the placement of the storage container within the interior of the cab of a pickup truck.

Both the left end compartment 2 and the right end compartment 4 include an angled portion 50 and 52 of their respective rear walls in order to accommodate the raised surface of the floorboard. As illustrated in FIG. 2 and discussed below the raised surface 80 extends outward towards the rear of the cab. Within the left end compartment 2, the angled portion 50 of the rear wall is enclosed by the left interior support wall 42 and the left front interior support wall 46. Within the right end compartment 4, the angled portion 52 of the rear wall is enclosed by the right interior support wall 44 and the right front interior support wall 48. Items may be stored within the left angled compartment formed by the left interior support wall 42, the left front interior support wall 46 and the left angled portion 50. Correspondingly, items may also be stored within the right angled compartment formed by the right interior support wall 44, the right front interior support wall 48 and the right angled portion 52.

The middle compartment 3 and the right end compartment 4 share a common wall at the right interior wall 34. The right interior wall 34 includes an aperture 54 through which a long item such as a tire jack handle may be stored in both the middle and right end compartments 3 and 4. The right exterior wall 36 also includes an aperture 56 for accommodating long items which may extend beyond the storage container.

The storage container 1 of the present invention is designed to fit within the interior of a vehicle such as a pickup truck, as illustrated in FIG. 2. The storage container 1 fits over the raised surface 80 of the floorboard and under a fold down seat 60. As illustrated in FIG. 2, the raised surface 80 has an expanded width dimension towards the rear of the cab. This expanded width dimension is accommodated by the angled portions 50 and 52, within the left end compartment 2 and the right end compartment 4. When the fold down seat 60 is in a down position, the storage container 1 remains underneath the seat 60. When the fold down seat 60 is in an up position and the covers 10, 12 and 14 are closed on the storage container 1 thereby providing a substantially flat surface, items such as grocery bags and the like, may be stacked on the covers 10, 12 and 14.

The storage container 1 of the preferred embodiment is kept from sliding forward by the seat belt restraint mechanism 90, positioned in front of the storage container 1, on either side of the cab. The storage container may also be secured to the floorboard by a bolt originally included for the tire jack.

FIG. 3 illustrates a top view of the storage container 1. FIG. 4 illustrates a front view of the storage container 1. FIG. 5 illustrates a side view of the storage container 1. As illustrated in FIGS. 3 and 4, the storage container 1 may include a locking mechanism 90 which will lock the covers 10, 12 and 14 in the closed position from within the interior of the storage container 1. The locking mechanism 90 controls the movement of the extension bars 144 and 146 when a key is positioned in the locking mechanism 90. When in a locked position, the extension bars 144 and 146 will be extended through the locking rings 144 and 146. The locking rings 144 and 146 are secured within the covers 10 and 14. The locking mechanism also includes a latch which will lock the middle cover 12 in a closed position. Alternatively, each of the covers 10, 12 and 14 may be locked separately by an appropriate locking device within each storage compartment or by a padlock or other such locking device on the outside of each storage compartment 2–4 of the storage container 1.

Preferably, the left end compartment 2, the right end compartment 4 and the middle compartment 3 are all integrally formed as one unit. The left and right end compartments 2 and 4 each have a height of 6¼ inches. The left compartment 2 has a length of 20½ inches. The right compartment has a length of 23½ inches. The middle compartment 3 has a height of 2¾ inches and a length of 18 inches. The storage container 1 has a total length of 62 inches and a total width of 12¾ inches. The left cover 10 has a length of 18⅝ inches and a width of 12¾ inches. The middle cover 12 has a length of 15⅛ inches and a width of 12¾ inches. The right cover 14 has a length of 25⅛ inches and a width of 12¾ inches. The left end cap 22 and the right end cap 24 are each 1½ inches thick. On either side of each of the covers 10, 12 and 14 there is a gap having a thickness of 1/32 inches. This gap facilitates easy opening of the covers 10, 12 and 14. The preferred embodiment of the present invention has been designed to fit within a Chevrolet and GMC model extended cab pickup truck. It should be apparent to those skilled in the art that the storage container 1 may have other dimensions as appropriate, in order to securely fit within other sized vehicles.

Preferably the storage container 1 is formed of a plastic material within an injection mold. Alternatively, the storage container 1 may be formed of any appropriate material including but not limited to wood, metal or fiberglass.

In an alternate embodiment, the left end compartment 2, the right end compartment 4 and the middle compartment 3 are formed of separate units and designed to fit together when mounted within the interior of the vehicle.

Figure 6:
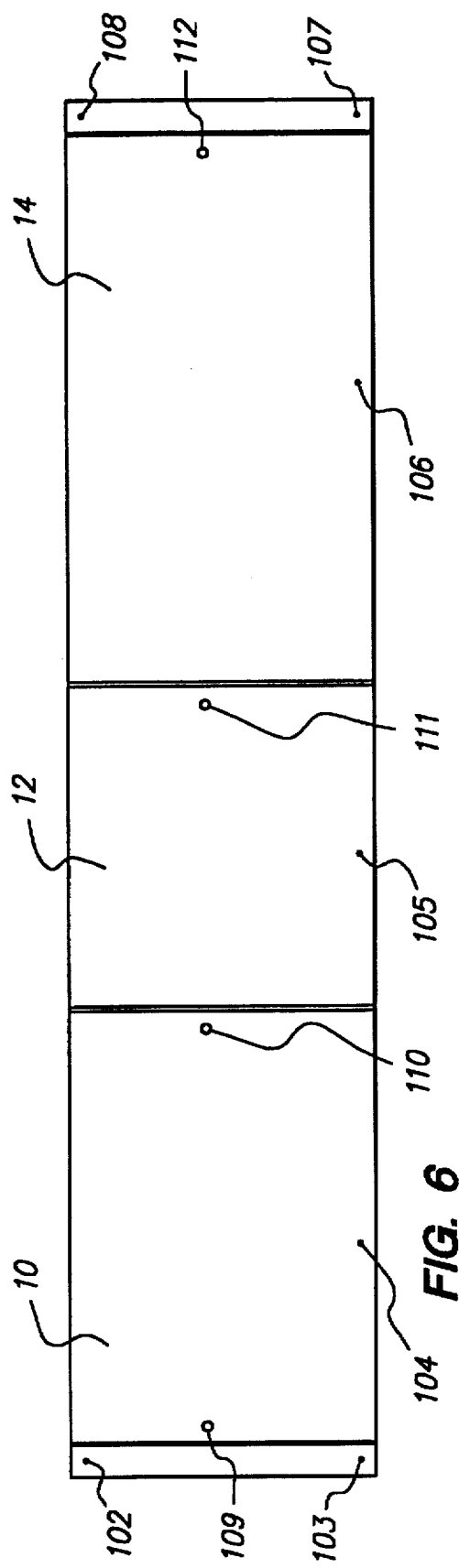
FIG. 6 illustrates a top view of an alternate embodiment of the vehicle interior storage container showing the placement of receiving holes and securing hooks for an exterior restraint apparatus of the present invention.
Figure 7:
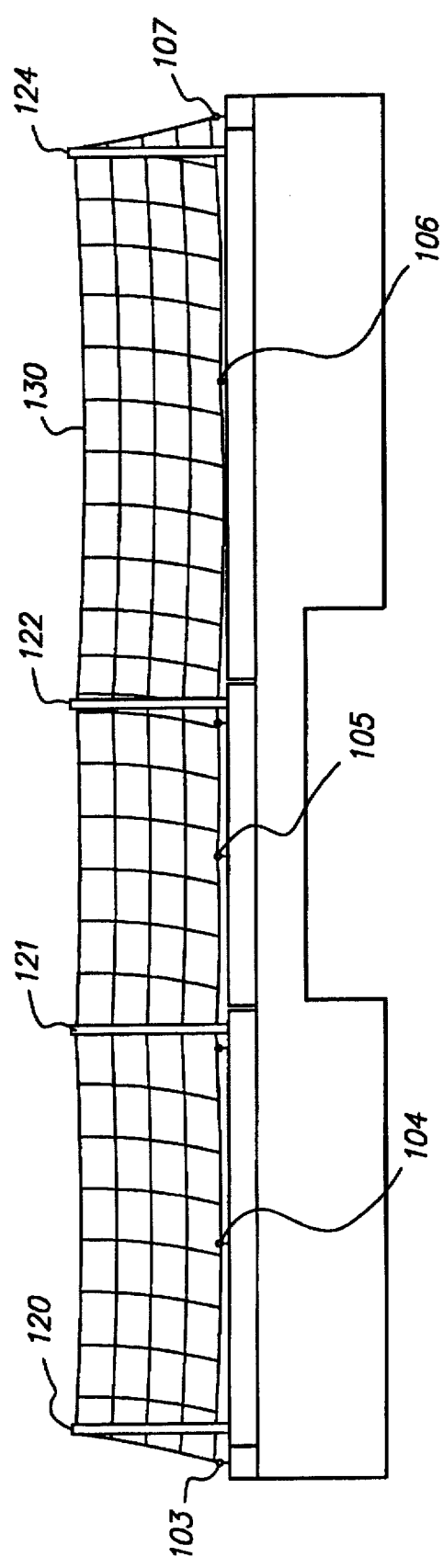
FIG. 7 illustrates a perspective view of the exterior restraint apparatus.

In a further alternate embodiment, the storage container 1 includes an exterior restraint apparatus, as illustrated in the FIGS. 6 and 7, for securing items stacked on top of the closed covers 10, 12 and 14. In this embodiment, the receiving holes 109–112 are formed within the covers 10, 12 and 14 and the securing hooks 102–108 are secured within the covers 10, 12 and 14. The supporting pole 120 is secured within the receiving hole 109. The supporting pole 121 is secured within the receiving hole 110. The supporting pole 122 is secured within the receiving hole 111. The supporting pole 124 is secured within the receiving hole 112. A net structure 130 is then coupled to the supporting poles 120–124 and to the securing hooks 102–108. When the net structure 130 is in place, items stacked on top of the covers 10, 12 and 14 are secured behind the net structure 130 and in front of the rear of the vehicle.

While the storage container 1 of the present invention has been described having three storage compartments, it will be apparent to those skilled in the art that any appropriate number of compartments and covers may be included within the storage container. In alternate embodiments, the storage compartments 2–4 may be divided or sectioned by trays, each having one or more compartments for storing smaller items.

Improvements and modifications which become apparent to persons of ordinary skill in the art only after reading this disclosure, the drawings and the appended claims are deemed within the spirit and scope of the present invention.

For example, the storage container 1 has been described and illustrated with three covers and three separate compartments. It will be apparent to those skilled in the art that any other appropriate number of compartments and covers may be included within the storage container 1.

I claim:

1. A mountable interior vehicle storage container of a size and dimension to fit underneath a seat of a vehicle for storing items within an interior of the vehicle, comprising a plurality of storage compartments each having an interior, an exterior and a substantially flat cover, wherein items may be stored within the interior of each storage compartment and maintained therein by the substantially flat covers and further wherein items may be stacked upon the substantially flat covers when they are in a closed position and further wherein at least two of the substantially flat covers are separately moving.

2. The storage container as claimed in claim 1 wherein the storage container includes a left end compartment, a right end compartment and a middle compartment.

3. The storage container as claimed in claim 2 wherein a passage is formed underneath the middle compartment allowing the storage container to straddle a raised surface within the interior of the vehicle.

4. The storage container as claimed in claim 1 further comprising an exterior restraint apparatus coupled to the substantially flat covers for restraining items stacked on the substantially flat covers.

5. The storage container as claimed in claim 1 further comprising a locking mechanism for locking each of the substantially flat covers in a closed position.

6. A mountable interior vehicle storage container for storing items within an interior of a vehicle, comprising:

a. a first end storage compartment having a first height dimension, a first interior, a first exterior and a first substantially flat cover for storing items within the first interior;

b. a second end storage compartment having the first height dimension, a second interior, a second exterior and a second substantially flat cover for storing items within the second interior; and c. a middle storage compartment coupled to the first end storage compartment and to the second end storage compartment, having a second height dimension, a third interior, a third exterior and a third substantially flat cover for storing items within the third interior, wherein items may be stacked upon the first, second and third substantially flat covers when each is in a closed position, wherein the first and second height dimensions are less than a seat height dimension from a floor of the vehicle to a bottom of a seat for mounting the storage container underneath a seat of a vehicle and further wherein the first, second and third substantially flat covers are separately moving.

7. The storage container as claimed in claim 6 wherein the second end storage compartment and the middle storage compartment share a common wall including an aperture through which a long item may be stored in both the middle and the second end storage compartments.

8. The storage container as claimed in claim 7 further comprising a locking mechanism for locking the first, second and third substantially flat covers in a closed position.

9. The storage container as claimed in claim 8 further comprising an exterior restraint apparatus coupled to the first, second and third substantially flat covers for restraining items stacked on the first, second and third substantially flat covers.

10. The storage container as claimed in claim 9 wherein the exterior restraint apparatus includes:

a. a plurality of support poles;

b. a plurality of receiving holes within the first, second and third substantially flat covers;

c. a plurality of hooks secured within the first, second and third substantially flat covers and extending above the first, second and third substantially flat covers; and d. a net for stretching between the plurality of support poles and the plurality of hooks thereby forming an enclosure between the net, a rear of the interior of the vehicle and the first, second and third substantially flat covers and securing items behind the net and on top of the first, second and third substantially flat covers.

11. The container as claimed in claim 10 wherein the second height dimension is less than the first height dimension.

12. The container as claimed in claim 11 wherein a passage is formed underneath the middle storage compartment allowing the storage container to straddle a raised surface within the interior of the vehicle.

13. The container as claimed in claim 12 wherein the vehicle is an extended cab pickup truck.

14. A mountable interior vehicle storage container for storing items within an interior of a vehicle, comprising one or more storage compartments each having an interior, an exterior and a substantially flat cover, wherein the storage container further comprises an uneven bottom surface for resting on a non-flat surface within the vehicle, wherein items may be stored within the interior of each storage compartment and maintained therein by the substantially flat cover, wherein items may be stacked upon the substantially flat cover when it is in a closed position, wherein the storage container includes a left end compartment having a left cover, a right end compartment having a right cover, and a middle compartment having a middle cover and further wherein the left, right and middle covers are separately moving.

15. The storage container as claimed in claim 14 wherein a passage is formed underneath the middle compartment allowing the storage container to straddle a raised surface within the interior of the vehicle.

16. The storage container as claimed in claim 14 further comprising an exterior restraint apparatus coupled to the substantially flat cover for restraining items stacked on the substantially flat cover.

17. The storage container as claimed in claim 14 further comprising a locking mechanism for locking the substantially flat cover in a closed position.

* * * * *